United States Patent [19]

Williams et al.

[11] 4,010,351
[45] Mar. 1, 1977

[54] CARTRIDGE HEATER WITH IMPROVED THERMOCOUPLE

[75] Inventors: David E. Williams; Edwin D. Hoyt, both of Hemet, Calif.

[73] Assignee: Rama Corporation, San Jacinto, Calif.

[22] Filed: Mar. 18, 1976

[21] Appl. No.: 668,236

[52] U.S. Cl. .............................. 219/523; 219/328; 219/510; 219/544; 219/552; 425/144

[51] Int. Cl.[2] .......................................... H05B 3/80

[58] Field of Search ........... 219/328, 331, 494, 505, 219/510, 523, 544, 552; 338/240, 241; 425/144

[56] References Cited

UNITED STATES PATENTS

| | | | |
|---|---|---|---|
| 3,754,118 | 8/1973 | Booker | 219/523 |
| 3,890,485 | 6/1975 | Kozbelt | 219/523 |
| 3,911,251 | 10/1975 | Day | 219/523 |
| 3,920,963 | 11/1975 | Beasley | 219/523 |
| 3,970,821 | 7/1976 | Crandell | 219/523 |

Primary Examiner—Volodymyr Y. Mayewsky
Attorney, Agent, or Firm—Georges A. Maxwell

[57] ABSTRACT

A cartridge heater with improved thermocouple comprising a tubular metal sheath with a front end, a metal plug closing the front end, a filler of dielectric material in the sheath rearward of the plug and an elongate resistance wire supported by the filler, said plug having a pair of spaced axially extending through holes, elongate insulating tubes with front and rear ends and engaged in said holes with their front ends spaced predetermined limited distances from the open front ends of the holes, a pair of elongate thermocouple wires with front end portions engaged through the sleeves and projecting forwardly therefrom and rear portions supported in said filler and projecting rearwardly through and from the sheath and metal deposits in the forward position of the holes in the plug in sealing engagement therewith and in heat conducting contact with the thermocouple wires.

7 Claims, 8 Drawing Figures

U.S. Patent  Mar. 1, 1977  4,010,351
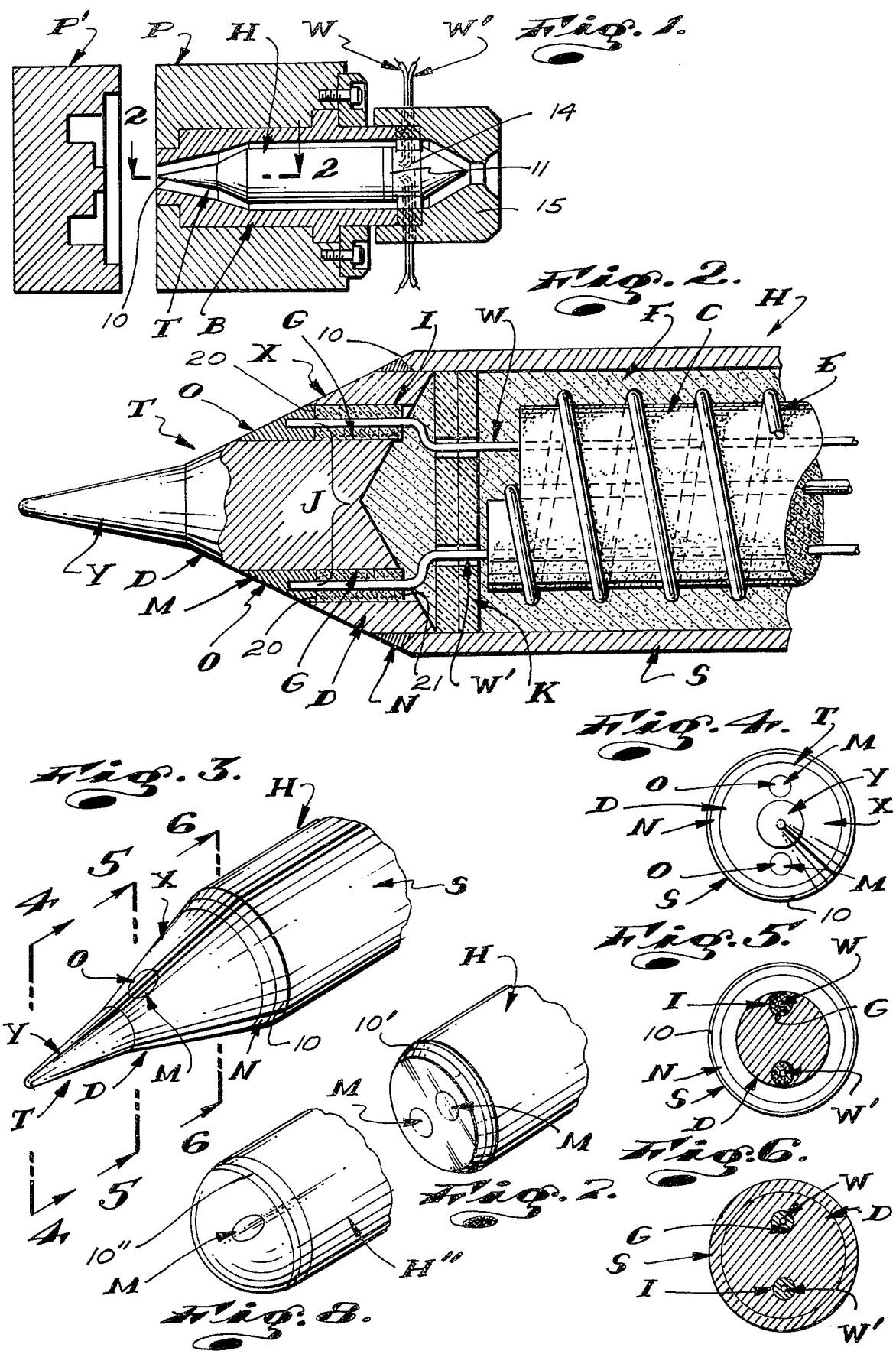

CARTRIDGE HEATER WITH IMPROVED THERMOCOUPLE

This invention has to do with cartridge type resistance heaters and is particularly concerned with an improved thermocouple structure for and in combination with cartridge type heaters.

Cartridge heaters of the class here concerned with are those heaters which are characterized by elongate tubular metal sheaths with elongate resistance heating elements arranged to extend longitudinally thereto and maintained centrally thereof, out of shorting contact with the sheaths, by fillers of insulating material, such as magnesium oxide, which is suitably compacted in the sheaths and about the elements. The sheaths are closed and sealed at their opposite ends by suitable plugs and the leads or conductors for the elements extend through and from the plugs at one end of the sheaths. Such heaters are commonly used throughout the industrial arts wherever heat is required and where use of heaters of the nature here concerned with is appropriate or suitable. Such heaters are frequently arranged to extend into fluid materials which must be heated, into mechanical structures which must be heated and into fluid handling structures wherein both the fluids and the structures are to be heated.

In an ever-increasing number of situations where cartridge heaters are employed, the temperature of the structure and/or material handled must be accurately controlled within close tolerances. In such situations, the temperature sensing devices or means of various sorts have been employed to sense the temperature of the structures and/or materials being heated and to control operation or the turning on and off of power to the heating elements of the heaters, so as to gain the desired temperature control.

Early temperature sensing devices employed to control the operation of cartridge heaters consisted (most commonly) of separate thermocouple units arranged within the material being heated or fixed to and carried by the structure to be heated or in which the materials to be heated were contained. Subsequently, and in order to integrate the heaters with their temperature control means and to gain the many advantages afforded thereby, thermocouple structures were incorporated in and/or with the cartridge heater structures.

It has been determined that the most effective, desirable and most widely accepted location or positioning of thermocouple means in or on such heaters is at the inner free ends of such heaters which extend into and terminate within the material and/or structure with which the heaters are related. The above noted inner free ends of such heaters are those ends of the heaters remote from the ends of the heaters from which the power leads extend and which are referred to as the outer ends of the heaters.

In preferred practice where the inner ends of cartridge heaters are provided with thermocouple means, the pair of conductor wires normally provided therefor, extend longitudinally through the cartridge structure in insulated spaced relationship with the cartridge sheath and the heating element thereof and extend through and project freely from the plugs in the outer ends of the heaters to connect with those heater control means with which the thermocouples are to be related.

A typical cartridge heater with thermocouple structure of the character referred to above and which is provided by the prior art is that structure described in U.S. Pat. No. 3,920,963, issued Nov. 18, 1975, for Resistance Heater With Improved Thermocouple.

The above noted prior art structure is produced and marketed by our assignee, RAMA INDUSTRIAL HEATER COMPANY of San Jacinto, Calif. and is believed by us to be one of the most effective and dependable, commercially available structure of its kind.

The principal shortcoming to be found in the above noted prior art structure and in other prior art structures of a similar nature resides in the fact that the thermocouple junctions established thereby are deep within the metal structure at the ends of the heaters and are such that they are slow to respond to changes in temperatures at and about the outer surfaces of the heaters. That is, the junctions are established within the metallic structure at the inner ends of the heaters to such an extent and in such a manner that temperature changes of the considerable and oftentimes excessive amount of metal must take place before the thermocouple can respond to any change of temperature at the surface of the heaters. It is to be noted that the metal between the surfaces of such heaters and the thermocouple junctions established therein is in fact a heat transfer medium which slows the transmission of heat from the surface of the heaters to the thermocouple junctions and prevents the attaining of fast response.

To the best of our knowledge, most, if not all, prior art thermocouple means or structures provided for incorporation in and with the inner ends of cartridge heaters are such that they prevent or greatly complicate the establishment or provision of special and uniquely formed inner ends on such heaters. For example, they are such that they prevent establishing the inner end of related heaters in a special, tapered and/or pointed form as is often desired and/or specified.

An object and feature of our invention is to provide a novel, improved thermocouple structure for incorporation in and/or combining with a cartridge heater and which is such that the thermocouple junction established thereby is materially closer to the surface of the heater than are the junctions of thermocouple structures provided by the prior art, whereby the time response of the thermocouple to temperature changes at the outer surface of the heater is very short as compared with the time response of the thermocouples provided by the prior art.

Another object and feature of our invention is to provide a structure of the character referred to above which is particularly suitable for use and/or incorporation in cartridge heaters having inner ends of special and unique shape or form.

It is yet another object and feature of our invention to provide a structure of the character referred to above which is easy and economical to make; which is highly effective and dependable in operation; and which is particularly suited for rapid, accurate and economical commercial production.

The foregoing and other objects and features of our invention will be understood and will be apparent from the following detailed description of a typical preferred form and application of our invention throughout which description reference is made to the accompanying drawings, in which:

FIG. 1 is a schematic view of a mold structure with a feed bushing and having a cartridge-type sprue heater embodying our invention related thereto;

FIG. 2 is an enlarged detailed sectional view of a portion of the heater shown in FIG. 1;

FIG. 3 is an isometric elevational view of the structure shown in FIG. 2, in reduced scale;

FIG. 4 is a view taken substantially as indicated by line 4—4 on FIG. 3;

FIG. 5 is a sectional view taken substantially as indicated by line 5—5 on FIG. 4;

FIG. 6 is a view taken substantially as indicated by line 6—6 on FIG. 4;

FIG. 7 is a view similar to FIG. 3 showing another configuration; and

FIG. 8 is a view similar to FIG. 3 showing yet another configuration.

The heater H that we provide and which is shown in the drawings is an elongate cylindrical unit with a front or inner end portion 10 and a rear or outer end portion 11.

In FIG. 1 of the drawings, the heater H is a sprue heater and is shown supported centrally in and extending longitudinally through a sprue opening in a feed bushing B in a mold plate P of a set of mold plates P and P' provided for the injection molding of plastic parts. The heater H has a forwardly tapered or pointed tip T at its inner end which is complimentarily shaped with the inner end portion of the sprue opening or passage in the bushing B. The outer rear end portion 11 of the heater H is fixed to the front end of the longitudinally outwardly convergent central island 14 of a spider within an injector engaging adapter cap 15 engaged on and carried by the outer free end of the bushing B.

The heater H serves to maintain the heated plastic which is conducted through the bushing hot, and to replenish that heat which is lost and conducted from the plastic into the bushing and the plate, whereby the plastic flows properly into the cavity or cavities defined by the mold plates P and P' and does not set up and foul the sprue bushing. With the structure here provided, the molded parts produced in the mold plates P and P' are produced with no discernible sprue.

In the prior art, it is old to provide heating means to heat sprue bushings to attain the ends attained by the above noted sprue heater, however, to gain such ends by heating sprue bushings requires large, high output, costly to operate heaters and result in structures which are very slow or sluggish in operation, that is, slow to adjust to changes in temperature, since heating the entire mass of the bushings as well as portions of the mold plates adjacent thereto must be effected in order to gain any increase in temperature of the plastic which is conducted through the bushings.

In the case of the instant sprue heater, the heater operates to heat the plastic within and flowing through the sprue bushing directly, thereby materially reducing the amount of current which must be utilized to attain a temperature change and greatly reducing the time required to attain such a change. In the structure here provided, heat losses into the mass of the bushing and the mold plate related thereto is a secondary loss and results in little wasted energy.

The basic construction of the heater H, rearward of the front end portion 10 thereof, is substantially conventional and involves no novel subject matter. Accordingly, we will restrict this disclosure to the forward end portion of the heater H and will describe only that portion of the remainder of the heater which is directly related to said front end portion.

The structure of the heater H directly rearward of the front end portion comprises an elongate, longitudinally extending, cylindrical central core C of magnesium oxide or the like, about which an elongate resistance wire or heating element E is helically wound. The forward end of the element E is turned radially inwardly at the front end of the core and is turned rearwardly to extend through a central opening in the core.

The core C is arranged centrally in and extends longitudinally through an outer metal sheath S, with the element E in spaced relationship with the said sheath.

The annulus between the sheath S and the core C is filled with a suitable insulating filler F, such as magnesium oxide. The filler F is compacted in the annulus and about the element E and core C by radially inward and axial swaging of the sheath during manufacture of the heater.

In addition to the foregoing and in accordance with old practice, the core C is provided with a pair of longitudinally extending openings through which a pair of thermocouple leads or wires W and W' are engaged. The openings for the wires W and W' are preferably located at diametrically opposite sides of the central opening in the core and are spaced substantially midway between the said central opening in the core and the exterior of said core, whereby the wires W and W' are maintained in spaced relationship from each other and from the element E throughout the longitudinal extent of the bore.

In practice, the rear end of the sheath is closed and sealed by a rear plug (not shown) of suitable insulating material, such as lava. The rear plug is provided with spaced axially extending through openings which occur in alignment with several openings in the core and through which the lead ends of the wires W and W' and lead ends of the element E extend. The lead ends of the element E (not shown) extend to and connect with suitable power supply means for the heater and the lead ends of the wires W and W' (not shown) extend to and connect with suitable control means for said power supply means.

As illustrated in FIG. 1 of the drawings, the several leads extend through legs of the spider which supports the heater H in the bushing adapter 15 and extend through and laterally from the sides of said adapter.

In accordance with our invention, the front portion 10 of the heater H includes a central metallic plug D tightly engaged in and sealed with the front end of the sheath S. The plug D is in axial spaced relationship with or from the front end of the core C.

The plug D is provided with a pair of circumferentially spaced longitudinally extending through bores G. The bores G snugly accommodate elongate tubular insulating sleeves I of magnesium oxide or the like. The sleeves I have front and rear ends 20 and 21. The front ends 20 of the sleeves I terminate a limited, short, predetermined distance rearward from the open front ends of the bores.

The front end portion of the wires W and W' are engaged in and through the sleeves I to extend freely therefrom and into the forward portions of the bores, forward of the front ends of the sleeves I as clearly shown in FIG. 2 of the drawings.

Finally, the front ends of the bores G, forwardly of the sleeve I are filled and sealed with metal contacts or deposits M. The metal deposits are established by welding or brazing whereby a positive contact is made between the deposits and the wires W and W' and, whereby the front ends of the bores are positively sealed. In practice, the front or outer surfaces O of the deposits M are dressed and finished so that those surfaces are in close predetermined spaced relationship from that point or location where the wires W and W' exit the front ends of the sleeves I.

The outer surfaces O of the deposits occur in direct intimate contact with the fluid medium in which the heater H is engaged. For example, the surfaces O are in direct contact with the plastic flowing in and through the sprue passage in the bushing B.

With the above structure, it will be apparent that the material of the deposits M occurring between the front ends of the sleeves I, where the wires W and W' first contact said deposits, and the outer surfaces O of said deposits establish the thermocouple junction at and/or between the forward portions of the wires W and W', exiting the sleeves I.

It will be apparent that since the surfaces O are in intimate contact with the fluid medium in which the heater is engaged and the fluid medium at the two surfaces O is at the same temperature, the thermocouple junction established by our structure is that small amount or thickness of metal that occurs between the wires W and W' at the front ends of the sleeves I and the point or area of the surface O closest thereto.

In practice, the thickness of metal at the junction end of the wires and establishing the thermocouple junction has been accurately established at 0.010 inches, without the exercise of any special and costly manufacturing techniques and/or procedures.

With the thermocouple junction thus established, it will be apparent that the junction includes an extremely small amount of metal, the temperature of which must be altered or changed in the normal use of the construction, whereby the thermocouple is responsive to small changes in temperature of the medium in which the heater is engaged and is quick to respond to such changes in temperature.

In the form of the invention shown in FIGS. 1 through 6 of the drawings, the heater H is provided with orienting means K to properly position the portions of the wires W and W' which extend between the core C and the plug D, during assembly of the structure. The means K consist of one or more discs of dielectric material such as magnesium oxide or lava arranged in the sheath between the plug and the core and having guide openings therein through which the wires are engaged and extend.

In the preferred carrying out of the invention, the plug D is fixed in and sealed with the sheath S by welding N.

In the course of fabricating the heater H, the assemblage is swaged axially and radially inwardly.

So as to permit the forward portion of the sheath about the plug D to be swaged inwardly as noted above, the plug must be capable of yielding or being deformed radially inwardly. To the above end, the rear end of the plug is suitably relieved, as shown in FIG. 2 of the drawings, to permit the plug to yield and collapse radially inwardly with the sheath, as the sheath is being swaged.

In the form of the invention illustrated, the forward end portion of the plug is conical, that is, it is tapered axially forwardly and radially inwardly as indicated at X in the drawings. In addition to its tapered surface, the plug is provided with a central forwardly projecting, tapered extension or tip T.

Tapering of the portion X of the plug and provision of the tip T is to adapt the heater H as a sprue heater, the exterior of which is complimentary with the configuration of the sprue passage in the feed bushing B with which the heater is related.

It will be abundantly clear that the structure that we provide, with its novel thermocouple means, is substantially uneffected by the configuration of the front end portion of the heater and that said front end portion of the heater can be easily and effectively made in substantially any desired shape or configuration. For example, and as shown in FIG. 7 of the drawings, the front end portion 10' of the heater H' can be flat, extending radially and disposed axially forwardly. If desired, and as shown in FIG. 8 of the drawings, the front end portion 10' of the heater H' can be spherical.

It is to be noted that the structure here provided is simple, practical and easy to make. Further, it is to be particularly noted that the structure and relationship of the wires W and W' and the sleeves I and the structure and/or relationship of said wires and sleeves with the bores G and the metal contact or deposits M is such that assembly and manufacture of the thermocouple within very close tolerances is made simple, fast and economical, using substantially standard mass production procedures and techniques.

Having described only a typical preferred form and application of our invention, we do not wish to be limited to the specific details herein set forth, but wish to reserve to ourselves any modifications and/or variations which may appear to those skilled in the art and which fall within the scope of the following claims.

Having described our invention, we claim:

1. A cartridge heater with improved thermocouple comprising a tubular metal sheath with a front end, a metal plug closing the front end, a filler of dielectric material in the sheath rearward of the plug and an elongate resistance wire supported by the filler, said plug having a pair of spaced axially extending through holes, elongate insulating tubes with front and rear ends and engaged in said holes with their front ends spaced predetermined limited distances from the open front ends of the holes, a pair of elonate thermocouple wires with front end portions engaged through the tubes and projecting forwardly therefrom and rear portions supported in said filler and projecting rearwardly through and from the sheath and metal deposits in the forward portions of the holes in the plug in sealing engagement therewith and in heat conducting contact with the thermocouple wires, said metal deposits being fused with the plug in said holes and with said thermocouple wires.

2. The structure set forth in claim 1 which further includes an insulating disc of dielectric material in the forward portion of the sheath between said element and front plug, said disc having radially spaced axially extending through openings through which the thermocouple wires are engaged to be supported in predetermined position between the element and the holes in the front plug.

3. The structure set forth in claim 1 wherein said front plug has a rear portion engaged within the front end portion of the sheath in tight sealed engagement therewith.

4. The structure set forth in claim 3 wherein the rear end portion of the front plug is relieved to allow for radial inward deformation thereof, said sheath being swaged radially inwardly and said rear end portion of said plug yielding radially inwardly with the sheath to establish a tight uniform seal therebetween.

5. The structure set forth in claim 3, wherein the forward annular end of the sheath is welded to the adjacent annular portion of the front plug.

6. The structure set forth in claim 4, wherein the forward annular end of the sheath is welded to the adjacent annular portion of the front plug.

7. The structure set forth in claim 3 which further includes an insulating disc of dielectric material in the forward portion of the sheath between said element and front plug, said disc having radially spaced axially extending through openings through which the thermocouple wires are engaged to be supported in predetermined position between the element and the holes in the front plug.

* * * * *